(12) United States Patent
Panda et al.

(10) Patent No.: US 9,836,329 B2
(45) Date of Patent: Dec. 5, 2017

(54) DECENTRALIZED PROCESSING OF WORKER THREADS

(71) Applicant: NetApp Inc., Sunnyvale, CA (US)

(72) Inventors: Sudip Kumar Panda, Bangalore (IN); Neera Mital, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 860 days.

(21) Appl. No.: 14/291,050

(22) Filed: May 30, 2014

(65) Prior Publication Data
US 2015/0347187 A1    Dec. 3, 2015

(51) Int. Cl.
G06F 9/46    (2006.01)
G06F 9/50    (2006.01)

(52) U.S. Cl.
CPC .... *G06F 9/5027* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 7,437,725 B1 * | 10/2008 | Chang | ............... | G06F 17/30893 709/201 |
| 7,650,602 B2 * | 1/2010 | Amamiya | ............. | G06F 9/3012 718/102 |
| 7,703,103 B2 * | 4/2010 | Spiegl | ................. | H04L 41/5012 709/201 |
| 8,776,077 B2 * | 7/2014 | Neary | ................... | G06F 9/5027 718/100 |
| 9,250,968 B2 * | 2/2016 | Sihn | ....................... | G06F 9/5016 |
| 9,354,935 B2 * | 5/2016 | Lee | ......................... | G06F 9/5038 |
| 9,417,917 B1 * | 8/2016 | Barber | ................. | G06F 9/5005 |
| 2005/0165881 A1 * | 7/2005 | Brooks | ................. | G06F 9/5027 709/200 |
| 2005/0240930 A1 * | 10/2005 | Amamiya | ............. | G06F 9/3012 718/100 |

* cited by examiner

*Primary Examiner* — Van Nguyen
(74) *Attorney, Agent, or Firm* — LeClairRyan, a Professional Corporation

(57) ABSTRACT

One or more techniques and/or systems are provided for managing one or more worker threads. For example, a utility list queue may be populated with a set of work item entries for execution. A set of worker threads may be initialized to execute work item entries within the utility list queue. In an example, a worker thread may be instructed to operate in a decentralized manner, such as without guidance from a timer manager thread. The worker thread may be instructed to execute work item entries that are not assigned to other worker threads and that are expired (e.g., ready for execution). The worker thread may transition into a sleep state if the utility list queue does not comprise at least one work item entry that is unassigned and expired.

15 Claims, 13 Drawing Sheets

DECENTRALIZED PROCESSING OF WORKER THREADS

BACKGROUND

Many software applications may process tasks using one more threads of execution. For example, a storage management application may create a backup scheduling thread, a file access thread, a new storage device identifier thread, and/or a variety of other threads that may be scheduled to execute using one or more processors.

DETAILED DESCRIPTION

Figure 1:
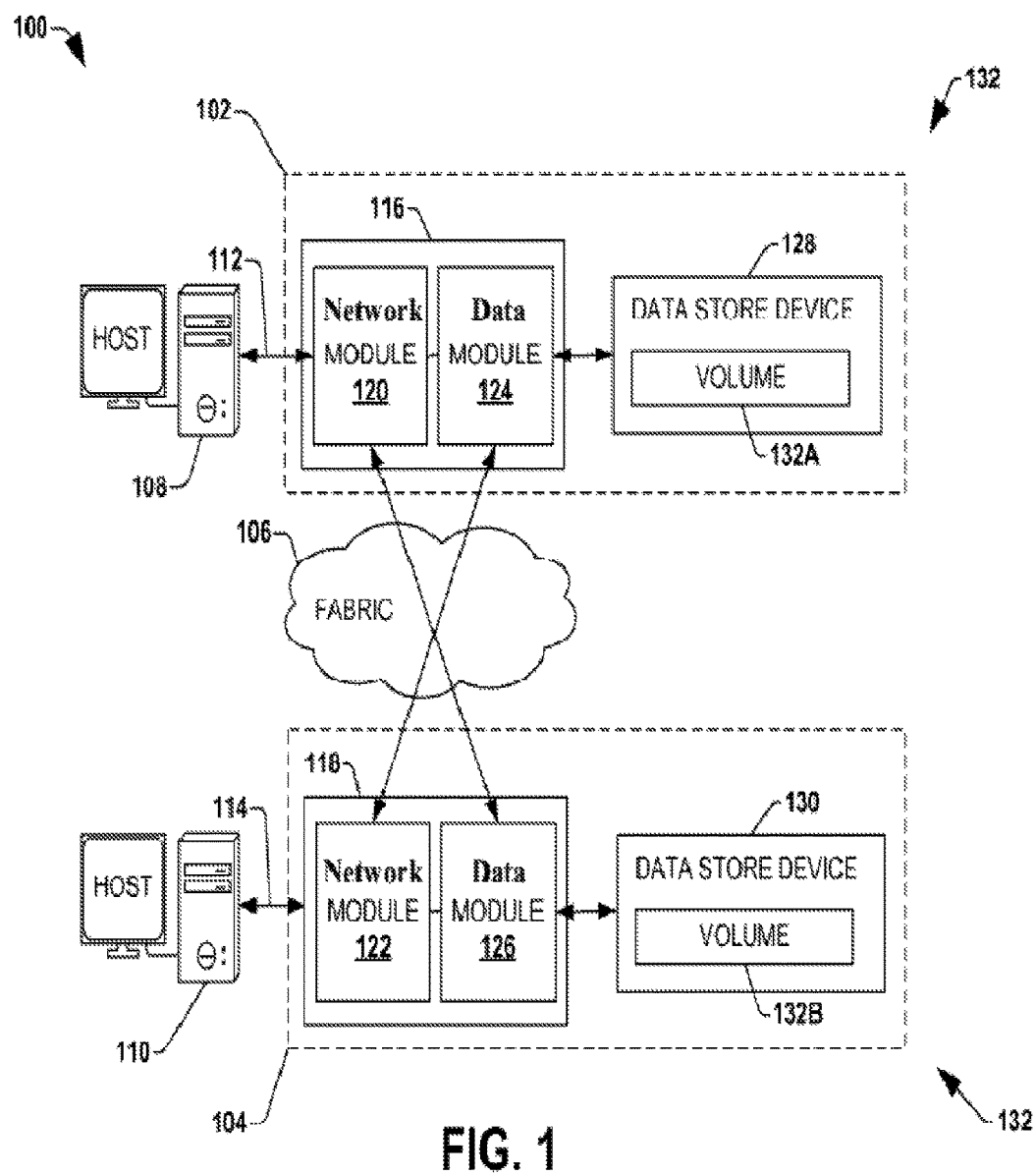
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for managing one or more worker threads are provided. A utility list queue may be populated with a set of work item entries for execution (e.g., a task to determine whether a file has been accessed; a task to determine whether a new storage server has responded to a welcome message; a task to determine whether communication with a storage server has timed out; etc.). A set of worker threads may be initialized to execute work item entries within the utility list queue. As provided herein, the set of worker threads may be initialized to execute work items in a decentralized manner, which may mitigate system resource utilization (e.g., overhead such as threads, queues, and/or signaling mechanisms otherwise consumed by a centralized timer manager thread that would have to manage the set of worker threads), serialization otherwise introduced by the centralized timer manager thread, and/or programming model complexity. For example, a worker thread may be instructed to evaluate the utility list queue to identify an unassigned work item entry (e.g., otherwise the worker thread may transition into a sleep state if the utility list queue does not comprise at least one unassigned work entry because merely a single worker thread may be assigned to a work item entry at any given time). Responsive to the assigned work item entry having an expired next run property (e.g., indicating that the assigned work item entry is ready for execution), the worker thread may execute the assigned work item entry and return the assigned work item entry into the utility list queue (e.g., otherwise the worker thread may transition into the sleep state because the assigned work item is not yet ready for execution). In this way, worker threads may intelligently execute work item entries with minimal oversight (e.g., without being managed by the centralized timer manager thread).

In an example of managing one or more worker threads, an operating system may comprise a policy feature component configured to provide file access notifications to an external policy server. The policy feature component is associated with a policy server manager configured to receive a file access notification from a kernel, format the file access notification (e.g., into an XML format), and send the file access notification to the external policy server. The policy server manager may process file access notifications associated with one or more virtual servers on a node within a cluster storage environment. The policy feature component may be configured with a policy, and a virtual server may utilize one or more polices. When a file access notification is sent to the external policy server, the file access notification is placed within a pending policy map (e.g., a dynamic array). A pending policy map may use execution context to determine whether a request (e.g., associated with the file access notification) within the pending policy map has timed out (e.g., no a response from the external policy server). Because it may not be feasible for a single thread to scan one or more pending policy maps, the set of worker threads may be utilized for scanning pending policies maps.

To provide context for managing one or more worker threads, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and/or data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that worker thread management may be implemented within the clustered network environment 100. For example, a queue management component and/or a thread configuration component may be implemented for the node 116 and/or the node 118. The queue management component may be configured to manage a utility list queue comprising a set of work item entries (e.g., tasks that may be associated with the node 116, the node 118, the host device 108, the host device 110, etc.). The thread configuration component may be configured to initialize a set of work threads to execute work item entries within the utility list queue.

Figure 2:
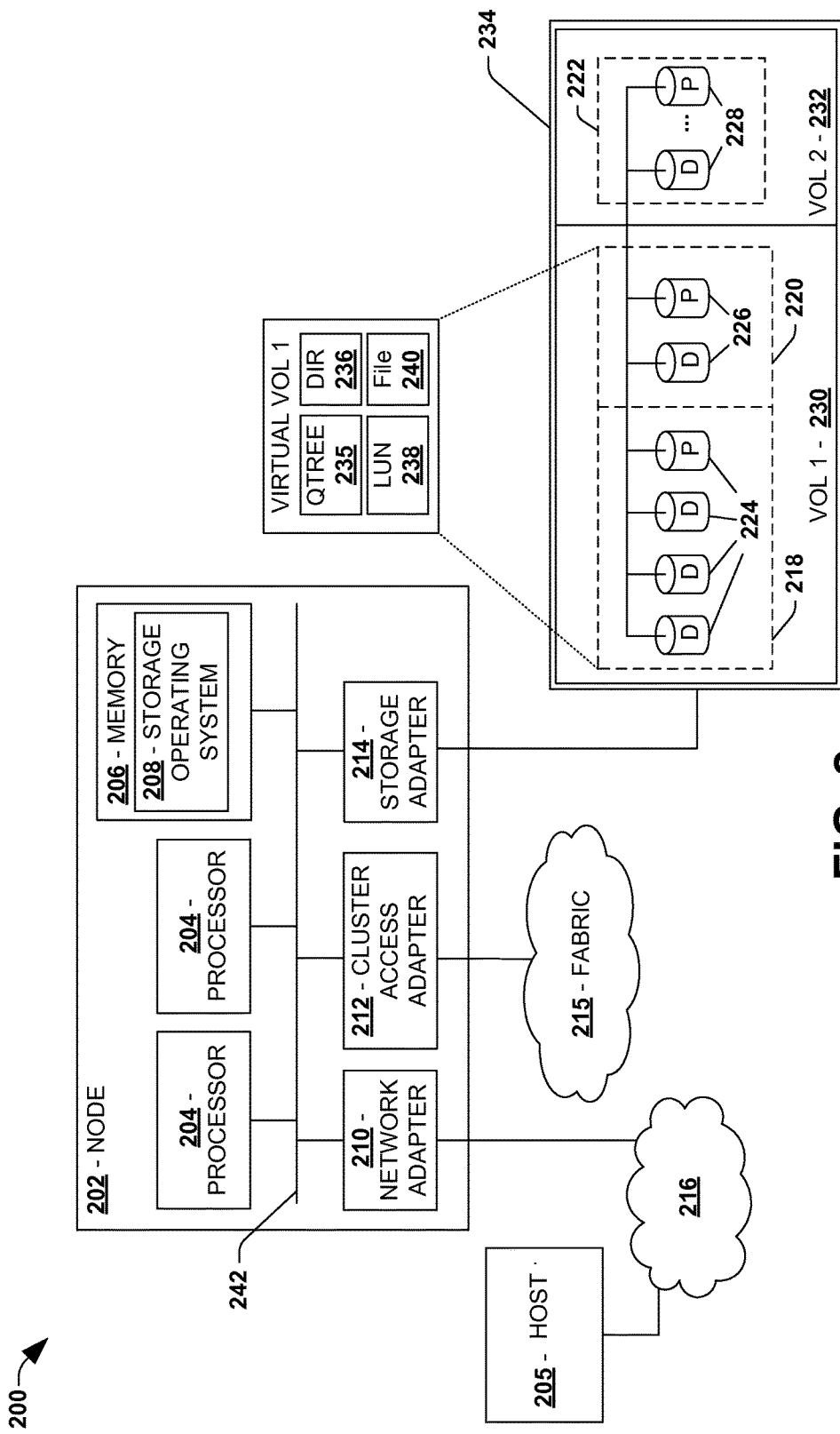
FIG. 2 is a component block diagram illustrating an example data storage system in accordance with one or more of the provisions set forth herein.

FIG. 2 is an illustrative example of a data storage system or storage site 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that worker thread management may be implemented for the data storage system or storage site 200. For example, a queue management component and/or a thread configuration component may be implemented for the node 202. The queue management component may be configured to manage a utility list queue comprising a set of work item entries (e.g., tasks that may be associated with the node 202, the host 205, etc.). The thread configuration component may be configured to initialize a set of work threads to execute work item entries within the utility list queue.

Figure 3:
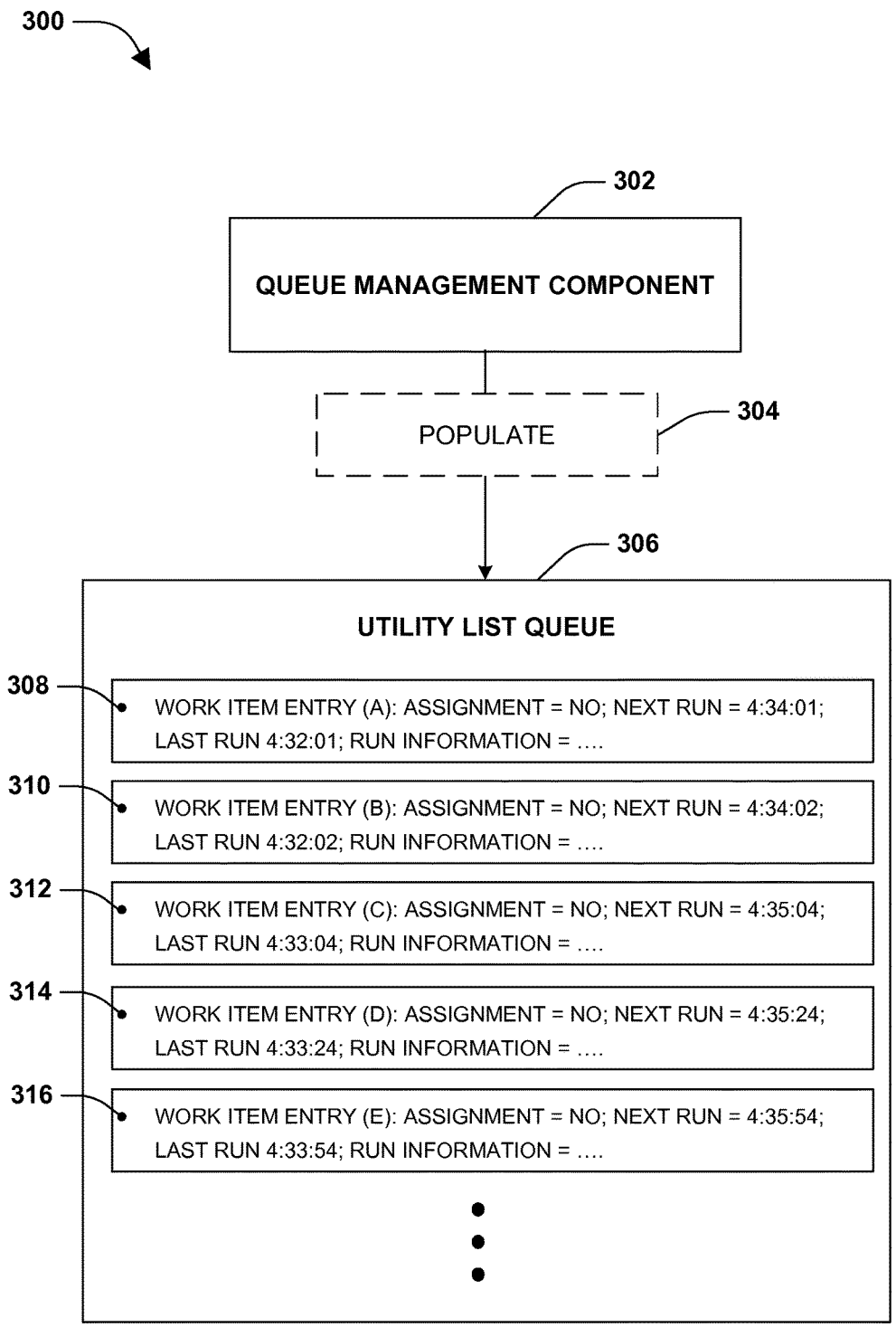
FIG. 3 is a component block diagram illustrating an exemplary system for populating a utility list queue.

FIG. 3 illustrates an example of a system 300 for managing a utility list queue 306. The system 300 comprises a queue management component 302. The queue management component 302 may populate 304 the utility list queue 306 with a set of work item entries for execution. Work item entries may corresponding a variety of tasks (e.g., a spell check task; a check for new storage service task; a check for request timeout task; a check for mail task; a file access notification timeout evaluation task; etc.). In an example, the queue management component 302 populates the utility list queue 306 with a work item entry (A) 308, a work item entry (B) 310, a work item entry (C) 312, a work item entry (D) 314, a work item entry (E) 316, and/or other work item entries. A work item entry may comprise an assignment property indicating whether the work item entry has been assigned to a worker thread, a next run property indicating a next time the work item entry is ready for execution, a last run property indicating a last time the work item entry was executed, run information used to execute the work item entry, and/or other properties. In an example, work item entries within the utility list queue 306 may comprise similar timeout values. In an example, the queue management component 302 may be configured to order the utility list queue 306 based upon next run properties of the set of work item entries. In this way, a worker thread may traverse the utility list queue 306 from a start position to an end position in order to evaluate work item entries according to next run properties (e.g., the utility list queue 306 is traversed in an order with which work item entries will become ready for execution based upon expiration of next run properties).

The queue management component 302 may be configured to insert and/or remove work item entries from the utility list queue 306. In an example of inserting work item entries, the queue management component 302 may acquire the utility list queue 306 (e.g., merely a single component or thread may acquire the utility list queue 306 at a time). A new work item entry may be inserted into the utility list queue based upon a next run property of the new work item entry (e.g., inserted into the end position based upon the next run property specifying a time that is later than times of next run properties of other work item entries within the utility list queue 306). The queue management component 302 may unlock the utility list queue 306 after insertion.

In an example of removing work item entries from the utility list queue 306, the queue management component 302 may acquire the utility list queue 306. Responsive to determining that a target work item entry has a delete pending flag, the target work item entry may be removed from the utility list queue 306. Responsive to determining that the target work item entry does not have a delete pending flag, a next run property of the target work item entry may be updated to create an updated work item entry having an updated next run property. The updated work item entry may be inserted into the end position of the utility list queue 306. The queue management component 302 may unlock the utility list queue.

Figure 4:
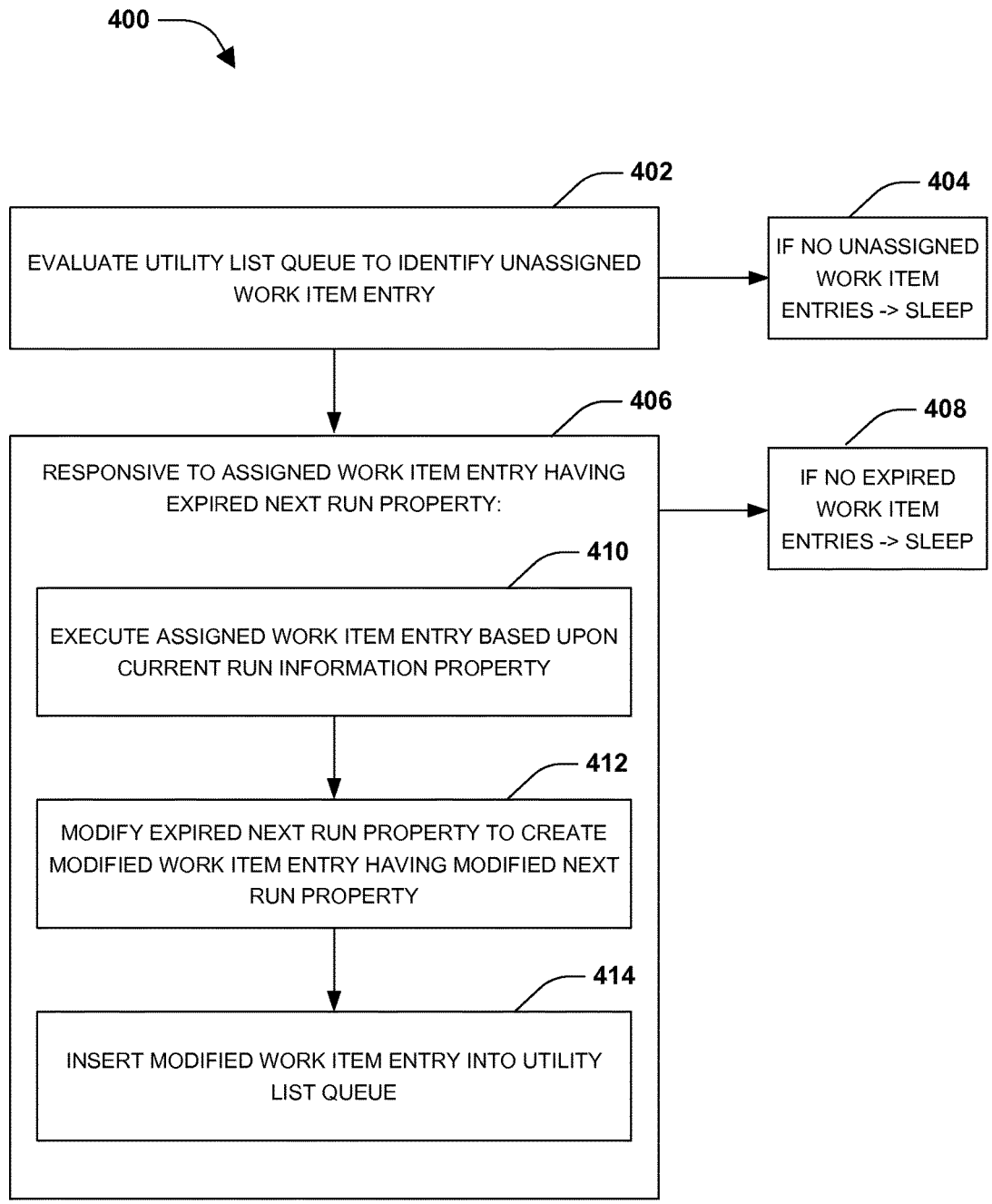
FIG. 4 is a flow chart illustrating an exemplary method of managing one or more worker threads.

One embodiment of managing one or more worker threads is illustrated by an exemplary method 400 of FIG. 4. In an example, a utility list queue is populated with a set of work item entries for execution (e.g., FIG. 3). A set of worker threads are initialized to execute work item entries within the utility list queue. For example, a first worker thread is instructed to evaluate the utility list queue to identify an unassigned work item entry for assignment to the first worker thread as an assigned work item entry, at 402. If the utility list queue does not comprise at least one unassigned work item entry, then the first worker thread may transition into a sleep state for a timeout period (e.g., the timeout period may be a set value or may be calculated based upon an expectancy of a work item entry becoming unassigned and/or ready for execution), at 404. Responsive to identify the unassigned work item entry, the first worker thread may be instructed to modify an assignment property of the unassigned work item entry from an unassigned state to an assigned state to create the assigned work item entry having a modified assignment property indicating that the assigned work item entry is assigned to the first worker thread.

At 406, the first worker thread may evaluate the assigned work item entry to determine whether the assigned work item entry has an expired next run property (e.g., indicating that the assigned work item entry is ready for execution). If the assigned work item entry has a non-expired next run property, then the first worker thread may transition into the sleep state for a timeout period (e.g., the timeout period may be a set value or may be calculated based upon the non-expired next run property such that the first worker thread may awaken into an active state for evaluating the utility list queue once the assigned work item entry is ready for execution), at 408.

Responsive to the assigned work item entry having the expired next run property, the first worker thread may execute the assigned work item entry based upon a run information property of the assigned work item entry, at 410. In an example of executing the assigned work item entry, the first worker thread may dequeue the assigned work item entry from the utility list queue. The first worker thread may unlock the utility list queue (e.g., so that other worker threads may evaluate the utility list queue). The first worker thread may execute the assigned work item entry using an execution context within the run information property. The first worker thread may acquire the utility list queue after execution. At 412, the expired next run property may be modified to create a modified work item entry having a modified next run property (e.g., indicating a time after which the modified work item entry will be ready for execution). In an example, a last run property of the assigned work item entry may be modified to create the modified work item entry having a modified last run property (e.g., corresponding to the time of execution by the first worker thread). In this way, the modified work item entry may have the modified work item entry and/or the modified last run property.

At 414, the first worker thread may insert the modified work item entry into the utility list queue based upon the modified next run property (e.g., inserted into an end position based upon the modified next run property specifying a time that is later than times of next run properties of other work item entries within the utility list queue). Responsive to the modified work item entry being inserted into the utility list queue, the first worker thread may evaluate the utility list queue to identify a second unassigned work item entry for assignment to the first worker thread as a second assigned work item entry. If the first worker thread does not identify at least one unassigned worker item entry within the utility list queue, then the first worker thread may transition into a sleep state. If the first worker thread identifies and acquires assignment of the second assigned worker item entry, then the first worker thread may evaluate a second next run property of the second assigned worker item entry. If the second next run property is a non-expired second next run property, then the first worker thread may transition into the sleep state. If the second next run property is an expired second next run property, then the first worker thread may execute the second assigned work item entry based upon a second run information property of the second assigned work item entry. The first worker thread may modify the second expired next run property to create a second modified work item entry having a second modified next run property. The first worker thread may insert the second modified work item entry into the utility list queue based upon the second modified next run property.

In an example, the set of worker threads may be initialized to process work item entries in parallel. For example, a second worker thread may be instructed to evaluate the utility list queue for work item entry execution. For example, the second worker thread may acquire the utility list queue for evaluation based upon the utility list queue being in an unlocked state (e.g., released by the first worker thread based upon the first worker thread entering the sleep state).

Figure 5A:
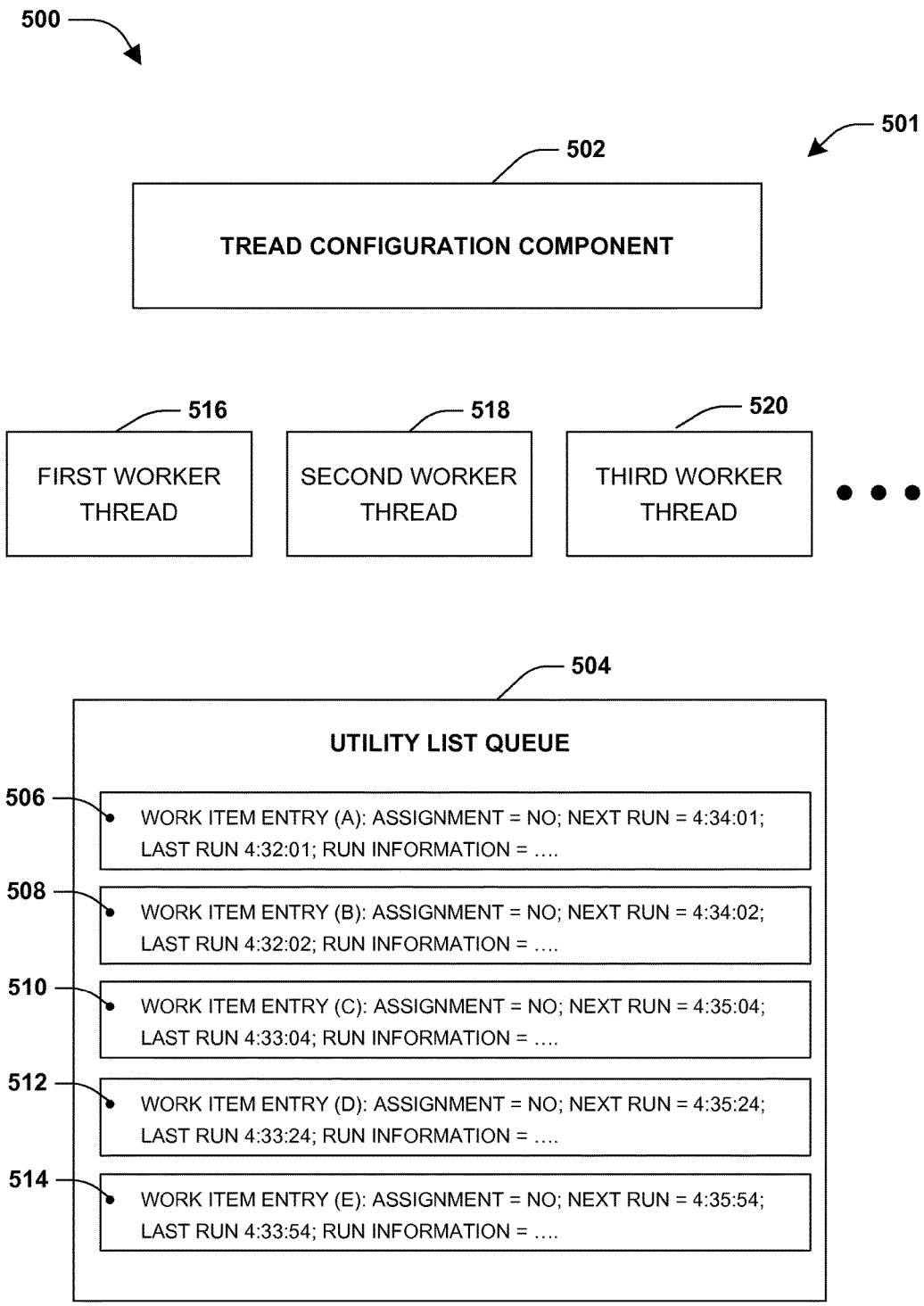
FIG. 5A is a component block diagram illustrating an exemplary system for managing one or more worker threads, where a set of worker threads are initialized.

FIGS. 5A-5H illustrate examples of a system 501 for managing one or more worker threads. FIG. 5A illustrates an example 500 of the system 501 comprising a thread configuration component 502. The thread configuration component 502 may initialize a first worker thread 516, a second worker thread 518, a third worker thread 520, and/or other worker threads. A worker thread may be instructed to evaluate a utility list queue 504 populated with one or more work item entries, such as a work item entry (A) 506, a work item entry (B) 508, a work item entry (C) 510, a work item entry (D) 512, a work item entry (E) 514, and/or other work item entries.

Figure 5B:
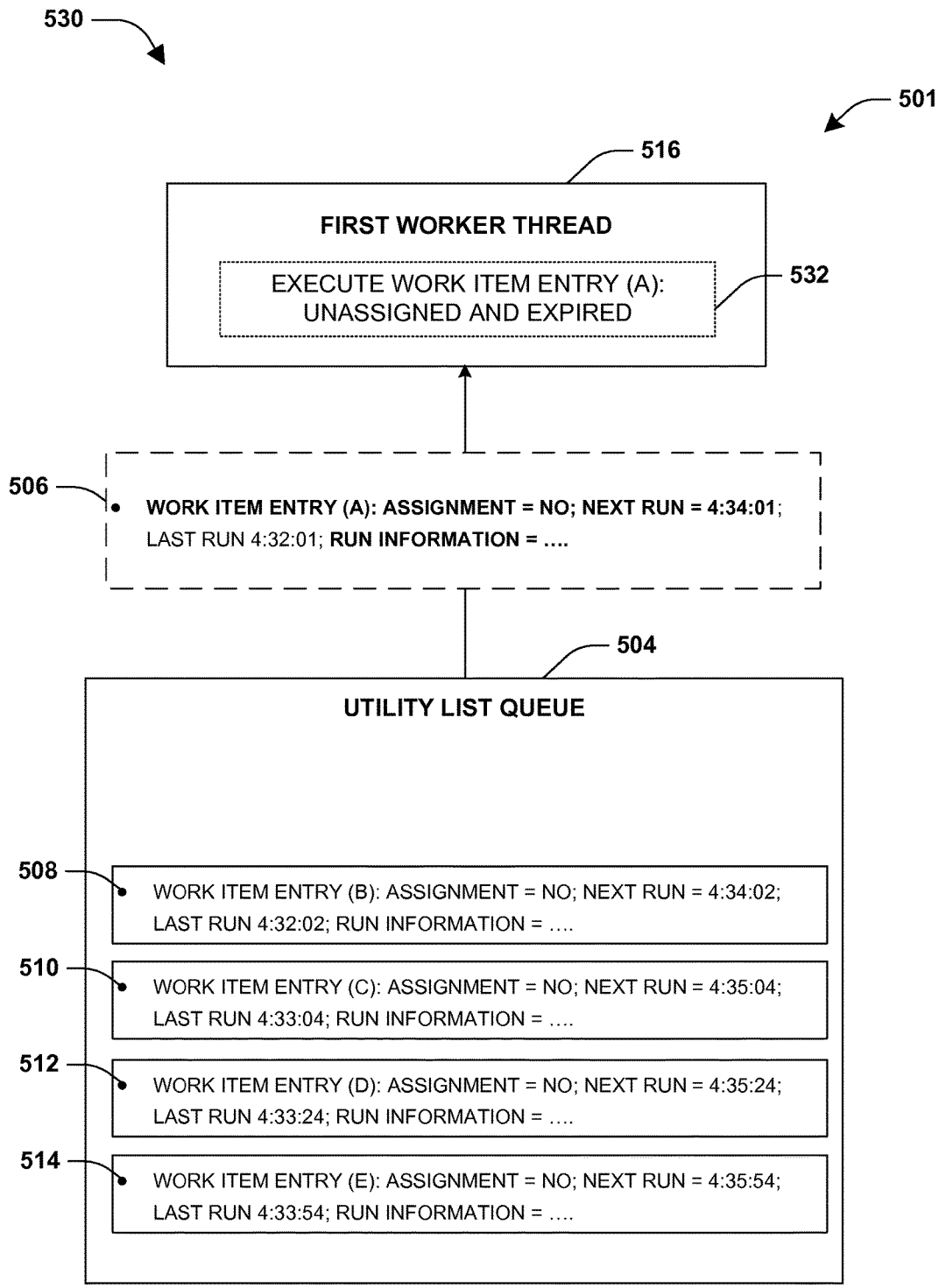
FIG. 5B is a component block diagram illustrating an exemplary system for managing one or more worker threads, where a first worker thread executes a work item entry (A).

FIG. 5B illustrates an example 530 of the first worker thread 516 evaluating the utility list queue 504. The first worker thread 516 may evaluate a work item entry at a start position of the utility list queue 504, such as the work item entry (A) 506. Responsive to the first worker thread 516 determining that the work item entry (A) 506 has an assignment property indicating that the work item entry (A) 506 is an unassigned work entry item, the first worker thread 516 may acquire assignment of the work item entry (A) 506 (e.g., the first worker thread may set the assignment property to indicate that the first worker thread 516 acquired the work item entry (A) 506). Responsive to the first worker thread 516 determining that the work item entry (A) 506 has an expired next run property (e.g., a next run property of 4:34:01 may be expired based upon a current time being 4:34:44), the first worker thread 516 may execute 532 the work item entry (A) 506.

Figure 5C:
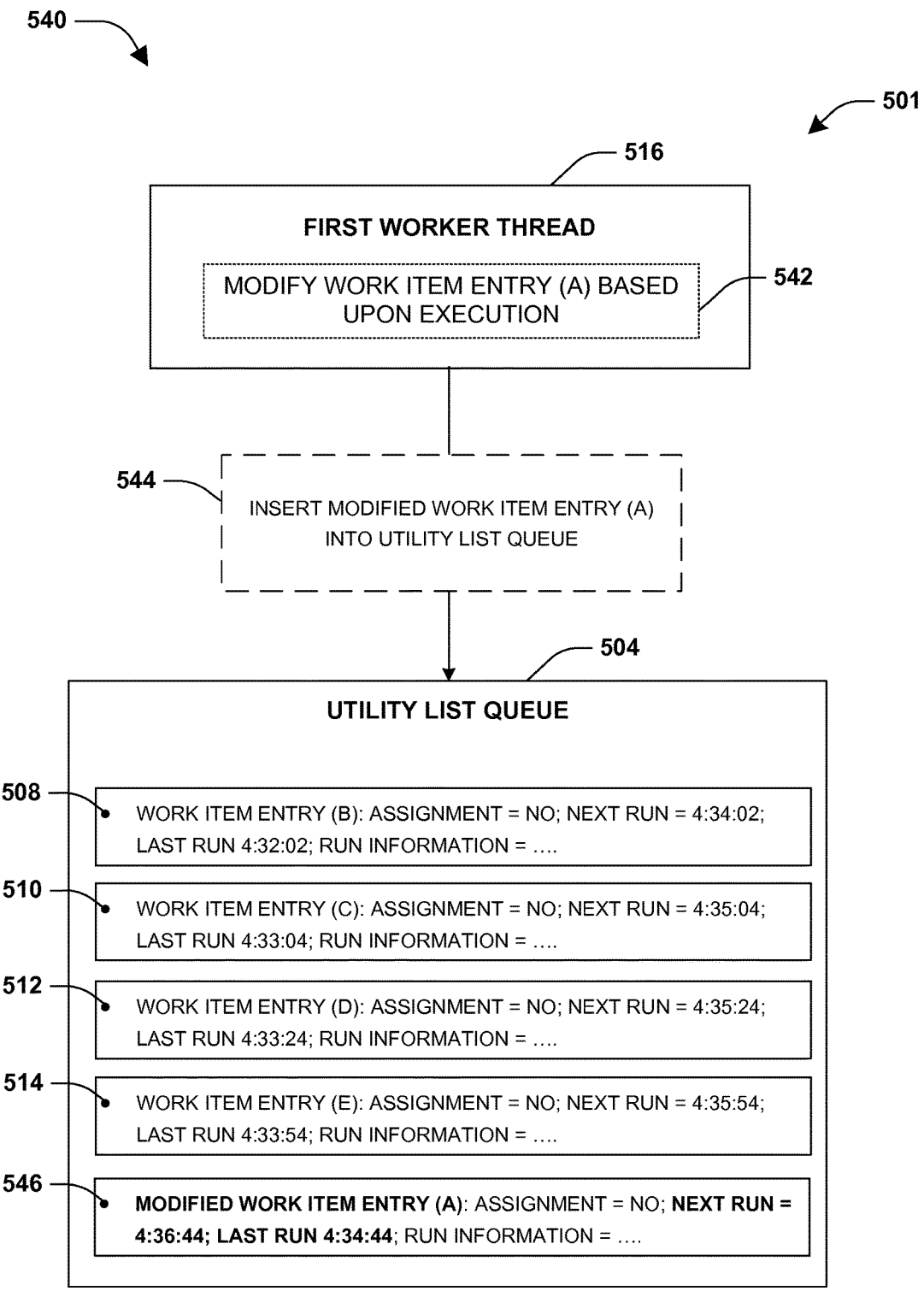
FIG. 5C is a component block diagram illustrating an exemplary system for managing one or more worker threads, where a first worker thread inserts a modified work item entry (A) into a utility list queue after execution of a work item entry (A).

FIG. 5C illustrates an example 540 of the first worker thread 516 modifying one or more properties of the work item entry (A) 506 to create a modified work item entry (A) 546. For example, the first worker thread 516 may modify the assignment property of the work item entry (A) 506 to create a modified assignment property indicating that the modified work item entry (A) 546 is unassigned (e.g., available for assignment to a worker thread). The first worker thread 516 may modify a last run property of the work item entry (A) 506 to create a modified last run property (e.g., set to 4:34:44 based upon the current time 4:34:44 at which the first worker thread 516 executed the work item entry (A) 506). The first worker thread 516 may modify a next run property of the work item entry (A) 506 to create a modified next run property (e.g., the modified work item entry (A) 546 may be scheduled to be ready for execution after 2 minutes). In this way, the modified work item entry (A) 546, comprising the modified assignment property, the modified last run property, and/or the modified next run property, may be inserted 544 into the utility list queue 504. For example, the modified work item entry (A) 546 may be inserted into an end position of the utility list queue 504 based upon the modified next run property specifying a time that is later than times of other next run properties of work item entries within the utility list queue 504.

Figure 5D:
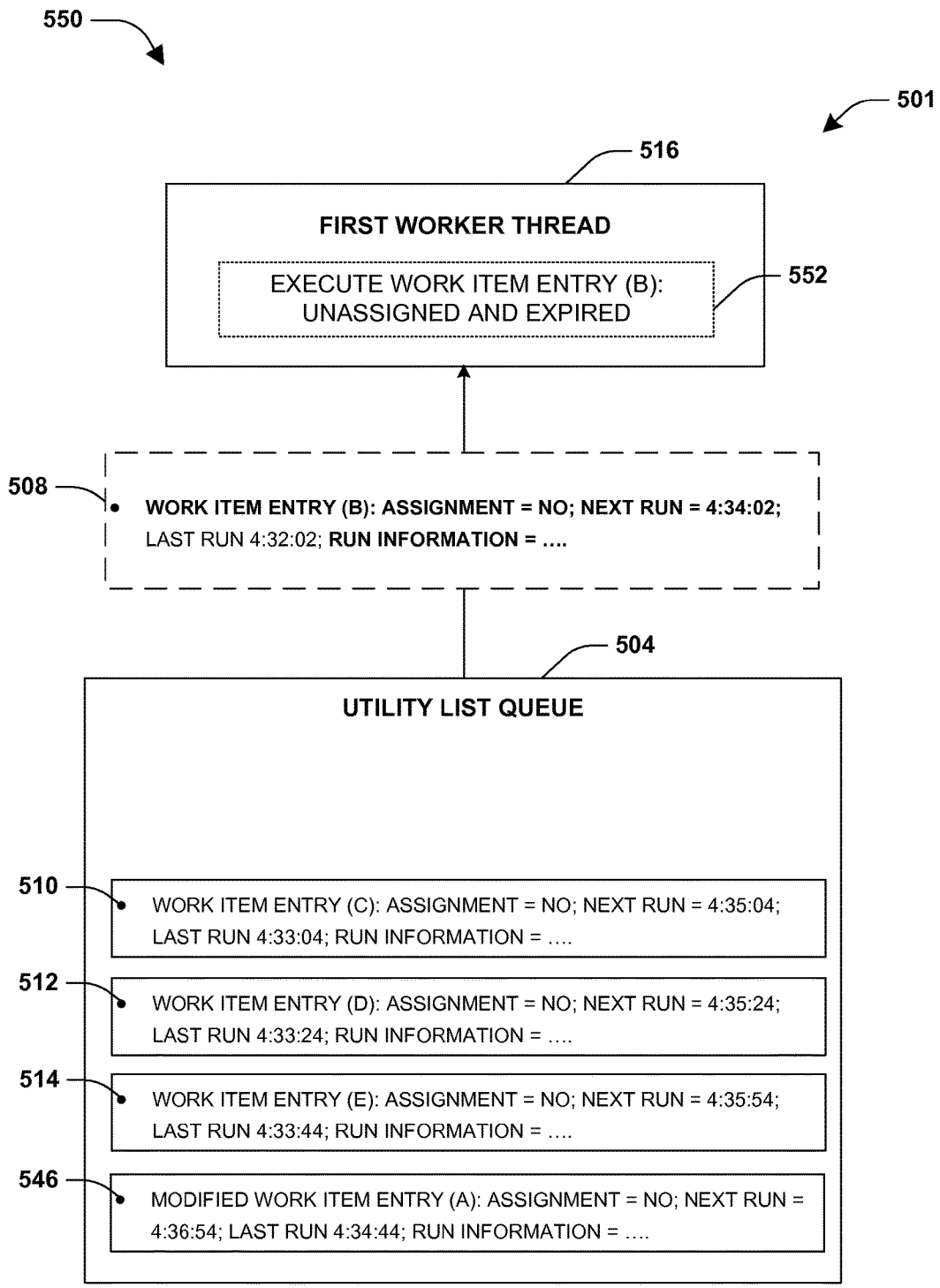
FIG. 5D is a component block diagram illustrating an exemplary system for managing one or more worker threads, where a first worker thread executes a work item entry (B).

FIG. 5D illustrates an example 550 of the first worker thread 516 evaluating the utility list queue 504 after inserting the modified work item entry (A) 546 into the utility list queue 504. The first worker thread 516 may evaluate a work item entry at a start position of the utility list queue 504, such as the work item entry (B) 508. Responsive to the first worker thread 516 determining that the work item entry (B) 508 has an assignment property indicating that the work item entry (B) 508 is an unassigned work entry item, the first worker thread 516 may acquire assignment of the work item entry (B) 508 (e.g., the first worker thread 516 may set the assignment property to indicate that the first worker thread 516 acquired the work item entry (B) 508). Responsive to the first worker thread 516 determining that the work item entry (B) 508 has an expired next run property (e.g., a next run property of 4:34:02 may be expired based upon a current time being 4:34:54), the first worker thread 516 may execute 552 the work item entry (B) 508.

Figure 5E:
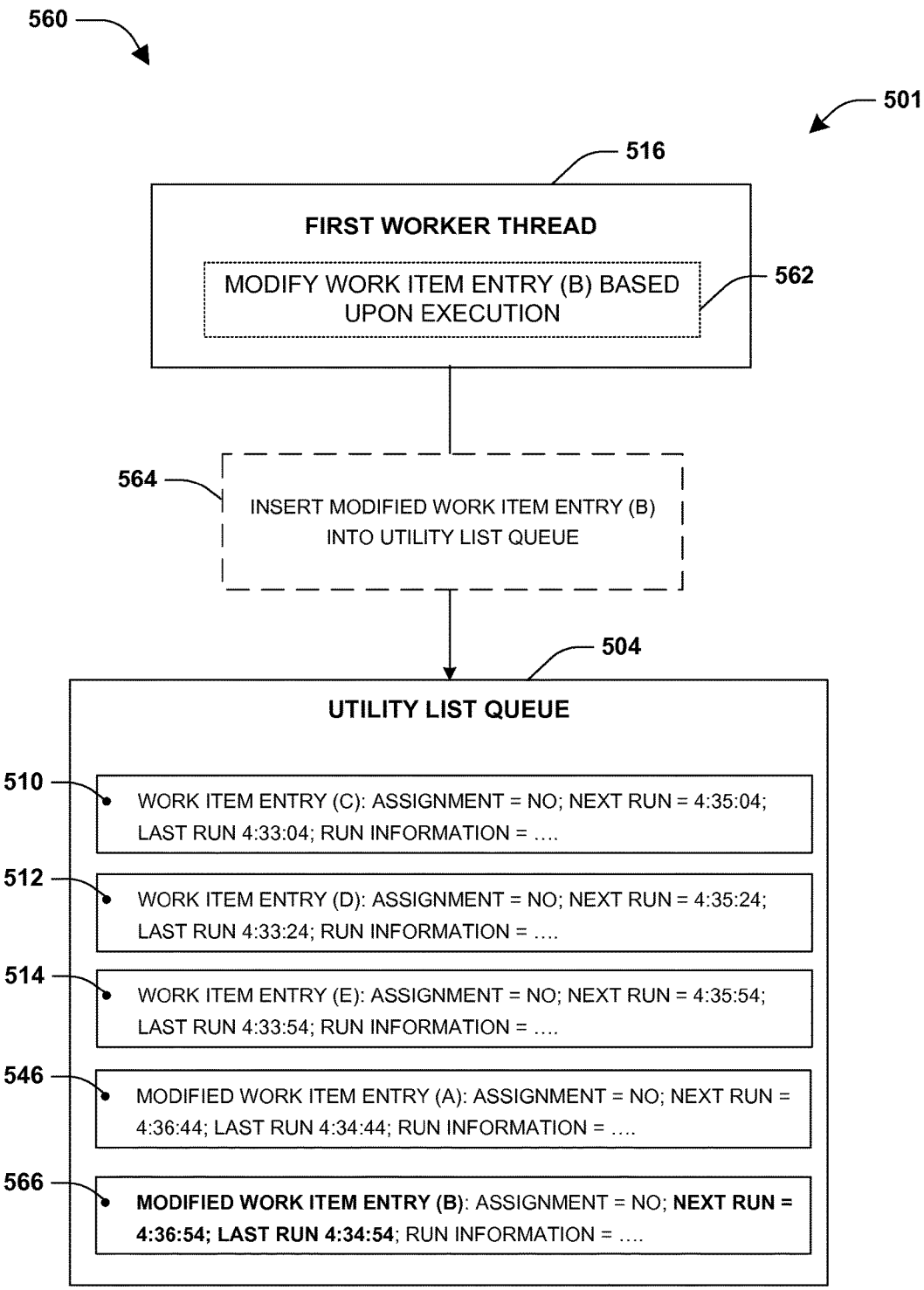
FIG. 5E is a component block diagram illustrating an exemplary system for managing one or more worker threads, where a first worker thread inserts a modified work item entry (B) into a utility list queue after execution of a work item entry (B).

FIG. 5E illustrates an example 560 of the first worker thread 516 modifying one or more properties of the work item entry (B) 508 to create a modified work item entry (B) 566. For example, the first worker thread 516 may modify the assignment property of the work item entry (B) 508 to create a modified assignment property indicating that the modified work item entry (B) 566 is unassigned (e.g., available for assignment to a worker thread). The first worker thread 516 may modify a last run property of the work item entry (B) 508 to create a modified last run property (e.g., set to 4:34:54 based upon the current time 4:34:54 at which the first worker thread 516 executed the work item entry (B) 508). The first worker thread 516 may modify a next run property of the work item entry (B) 508 to create a modified next run property (e.g., the modified work item entry (B) 566 may be scheduled to be ready for execution after 2 minutes). In this way, the modified work item entry (B) 566, comprising the modified assignment property, the modified last run property, and/or the modified next run property, may be inserted 564 into the utility list queue 504. For example, the modified work item entry (B) 566 may be inserted into the end position of the utility list queue 504 based upon the modified next run property specifying a time that is later than times of other next run properties of work item entries within the utility list queue 504.

Figure 5F:
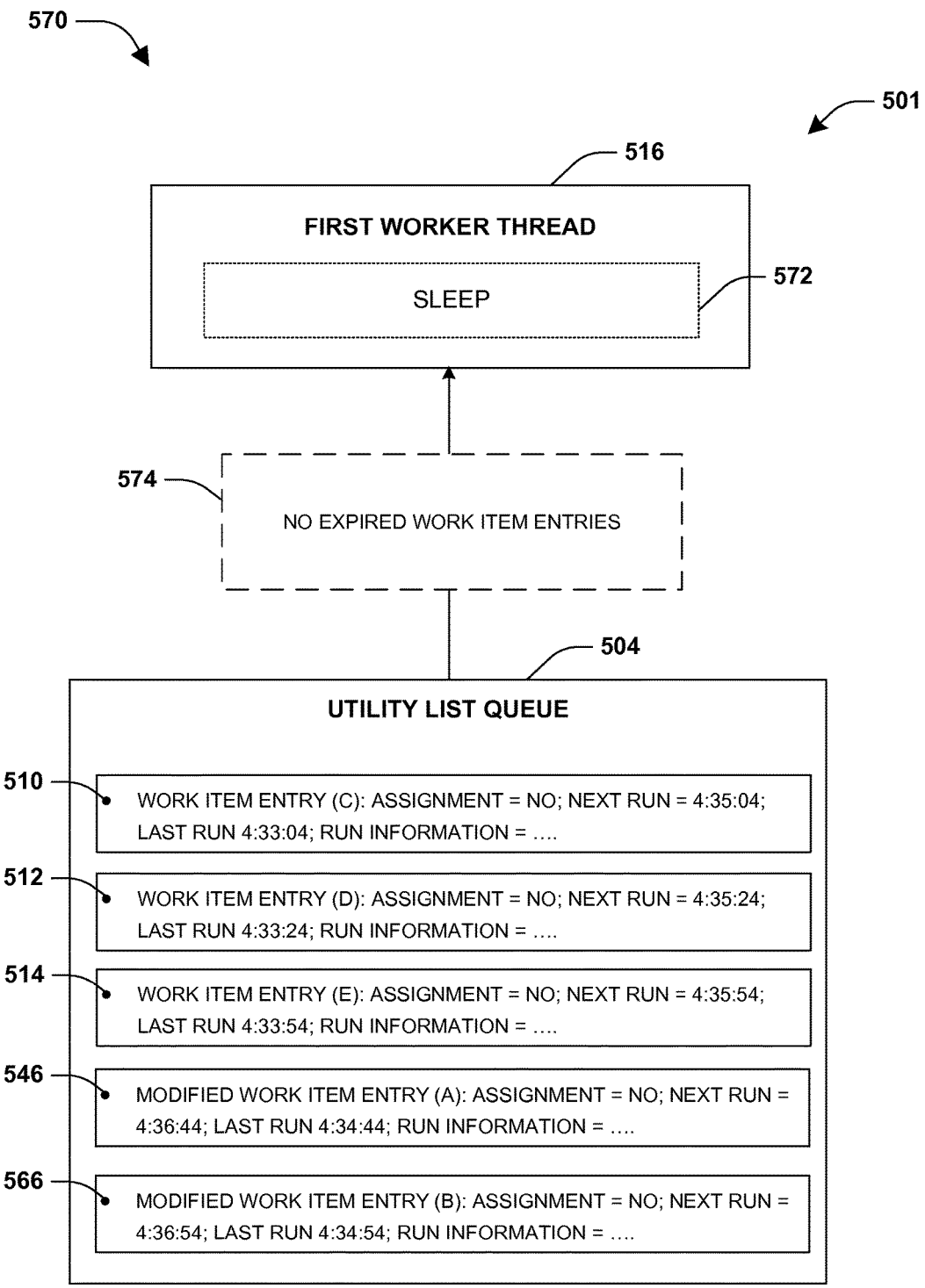
FIG. 5F is a component block diagram illustrating an exemplary system for managing one or more worker threads, where a first worker thread transitions into a sleep state.

FIG. 5F illustrates an example 570 of the first worker thread 516 evaluating the utility list queue 504 after inserting the modified work item entry (B) 566 into the utility list queue 504. The first worker thread 516 may evaluate a work item entry at a start position of the utility list queue 504, such as the work item entry (C) 510. Responsive to the first worker thread 516 determining that the work item entry (C) 510 has an assignment property indicating that the work item entry (C) 510 is an unassigned work entry item, the first worker thread 516 may acquire assignment of the work item entry (C) 510 (e.g., the first worker thread 516 may set the assignment property to indicate that the first worker thread 516 acquired the work item entry (C) 510). Responsive to the first worker thread 516 determining 574 that the work item entry (C) 510 has a non-expired next run property (e.g., a next run property of 4:35:04 may not yet have expired based upon a current time being 4:34:59), the first worker thread 516 may transition into a sleep state 572 for a first timeout period (e.g., based upon determining 574 that the utility list queue 504 does not comprise at least one expired work item entry). In an example, the first timeout period may correspond to the non-expired next run property so that the first worker thread 516 is awakened into an active state for processing work item entries, such as the work item entry (C) 510.

Figure 5G:
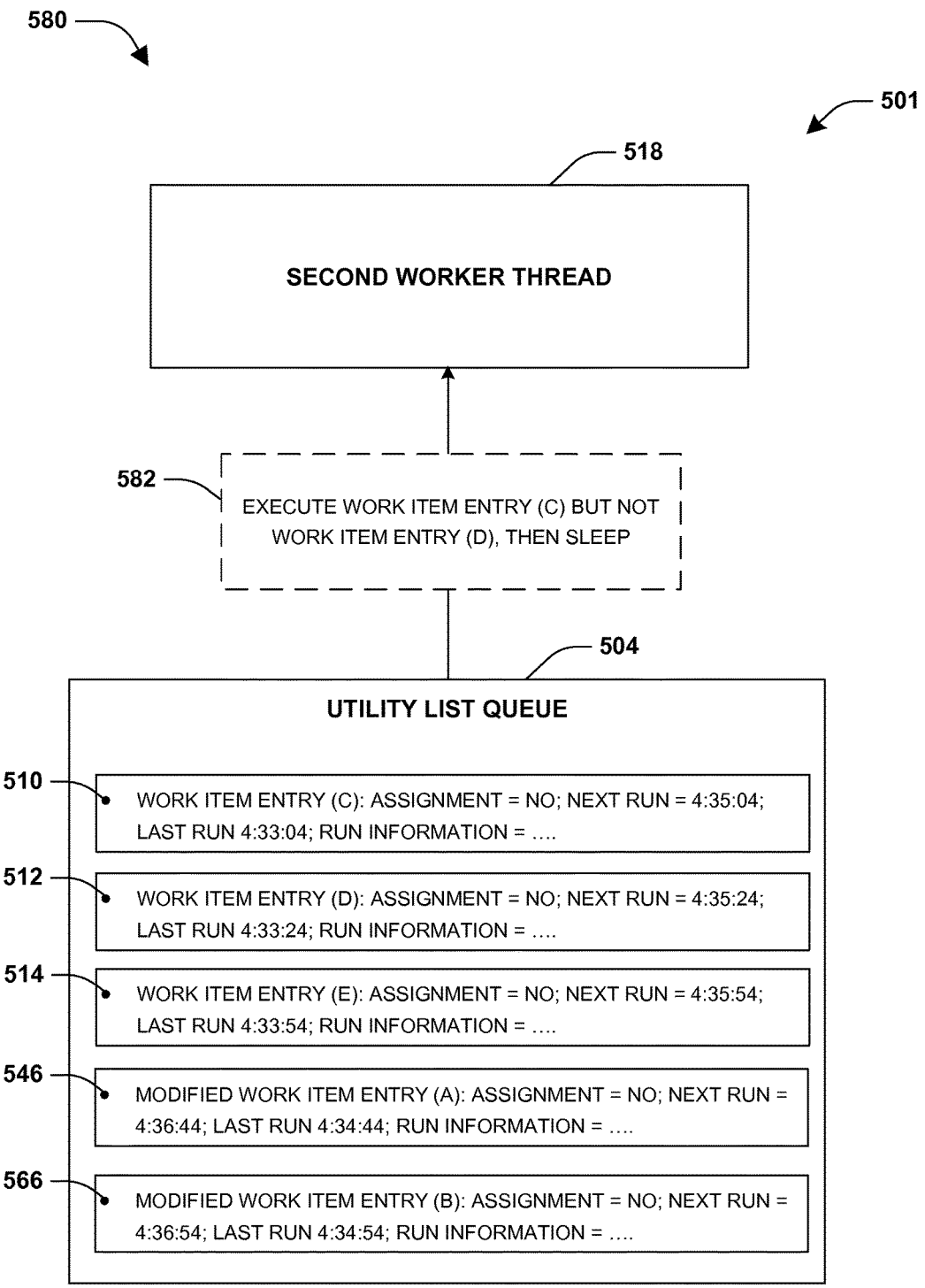
FIG. 5G is a component block diagram illustrating an exemplary system for managing one or more worker threads, where a second worker thread executes a work item entry (C).

FIG. 5G illustrates an example 580 of the second worker thread 518 evaluating the utility list queue 504. In an example, the first worker thread 516 may have unlocked the utility list queue 504 based upon transitioning into the sleep state 572 (e.g., FIG. 5F). Accordingly, the second worker thread 518 may evaluate 594 the utility list queue 504 for work item entry execution.

Figure 5H:
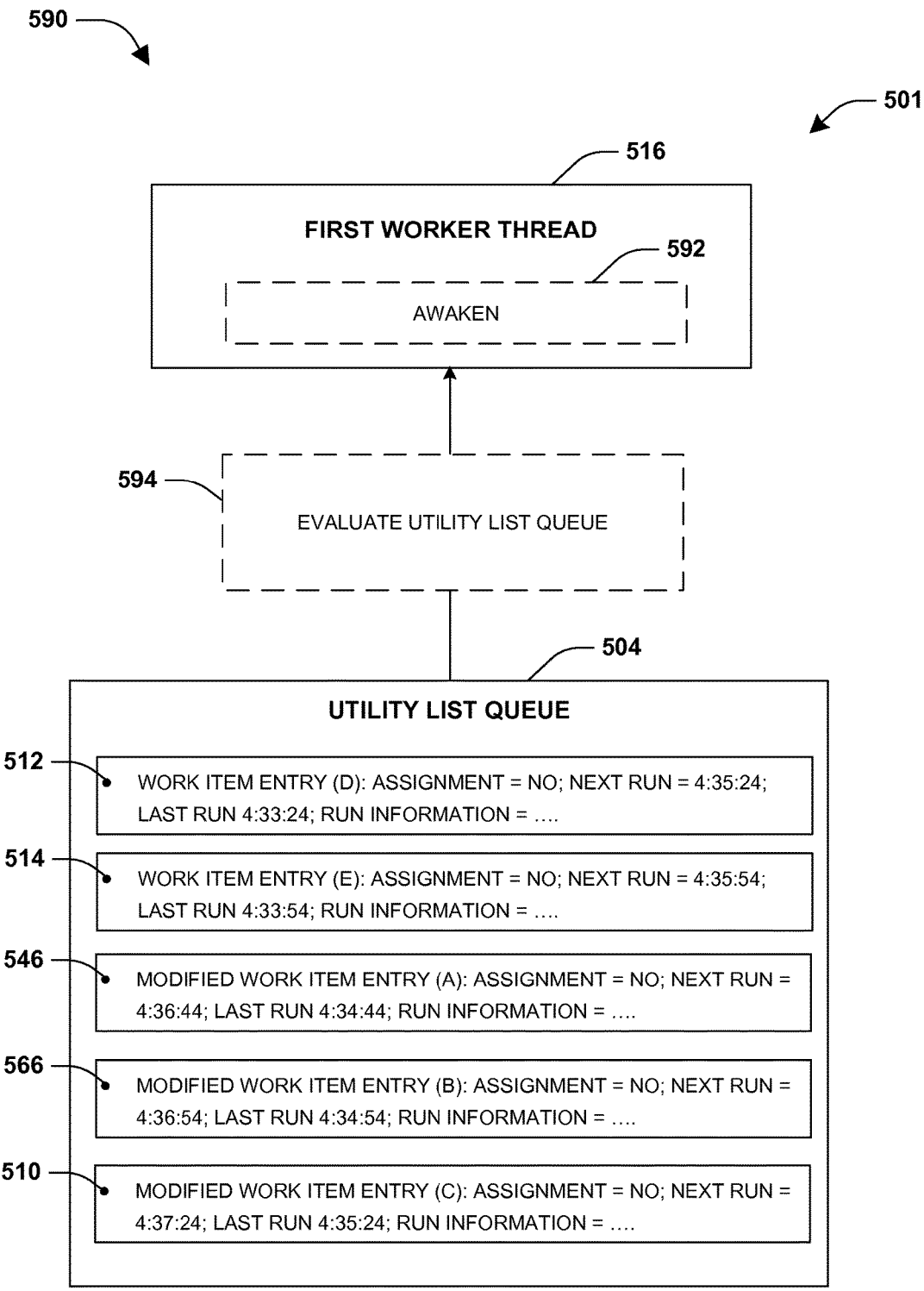
FIG. 5H is a component block diagram illustrating an exemplary system for managing one or more worker threads, where a first worker thread awakens into an active state for evaluating a utility list queue.

FIG. 5H illustrates an example 590 of the first worker thread 516 awakening 592 into an active state. For example, the first timeout period set for the first worker thread 516, as illustrated in example 570 of FIG. 5F, may expire. Accordingly, the first worker thread 516 may awaken 592 into the active state based upon expiration of the first timeout period. The first worker thread 516 may evaluate 594 the utility list queue 504 for work item entry execution. In this way, the set of worker threads may process work item entries within the utility list queue 504 in a decentralized (e.g., non-supervised) manner.

Figure 6:
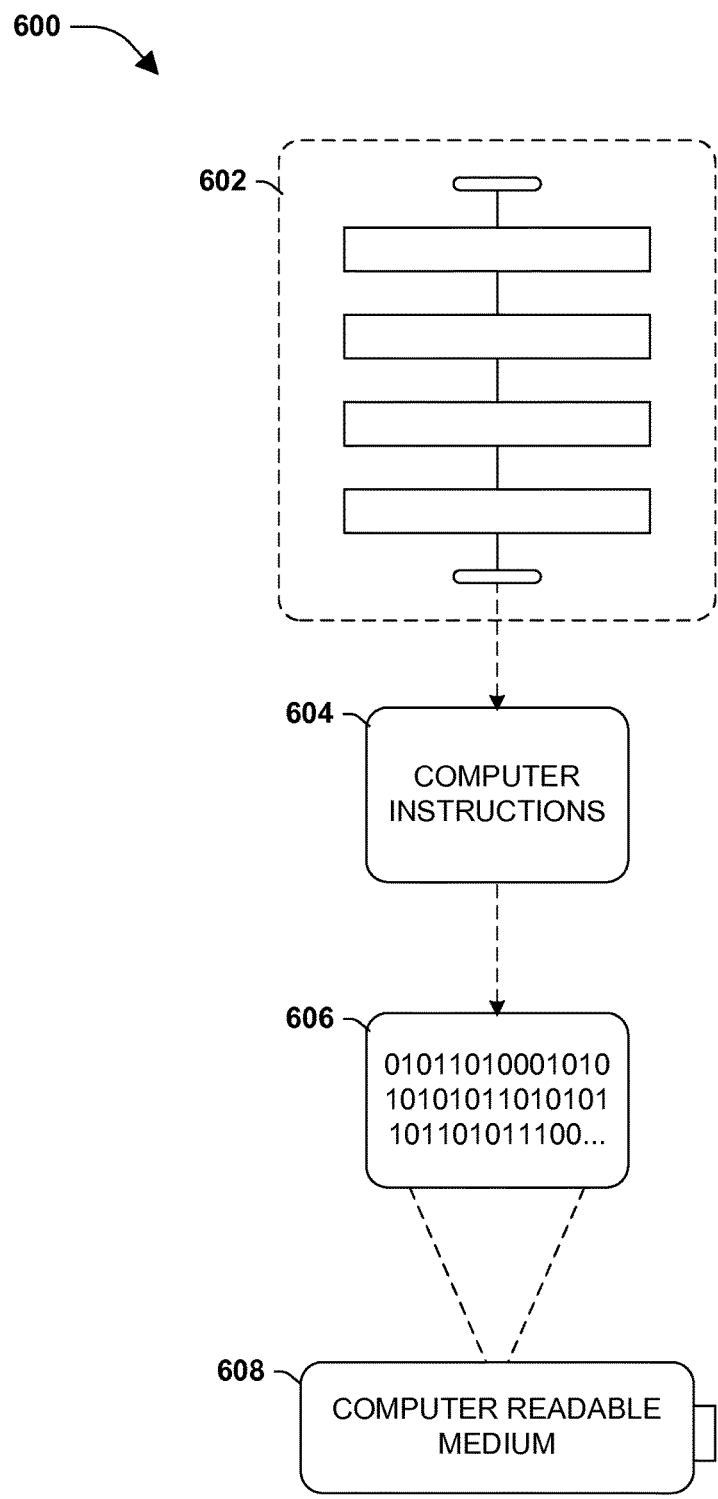
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable instructions 604 are configured to implement a system, such as at least some of the exemplary system 300 of FIG. 3 and/or at least some of the exemplary system 501 of FIGS. 5A-5H, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   acquiring, by the computing device, a utility list queue;
   populating, by the computing device, the acquired utility list queue with a set of work item entries for execution;
   initializing, by the computing device, a set of worker threads to execute work item entries within the utility list queue, the initializing comprising instructing a first worker thread to evaluate the utility list queue to identify an unassigned work item entry for assignment to the first worker thread as an assigned work item entry;
   executing, by the computing device, the assigned work item entry based upon a run information property of the assigned work item entry, modifying the expired next run property to create a modified work item entry having a modified next run property, and inserting the modified work item entry into the utility list queue based upon the modified next run property when determined that the assigned work item entry has an expired next run property;
   removing, by the computing device, a target work item entry from the utility list queue when determined that the target work item entry has a delete pending flag; and
   updating, by the computing device, a next run property of the target work item entry to create an updated work item entry having an updated next run property, inserting the updated work item entry into an end position of the utility list queue, and unlocking the utility list queue, when determined that the target work item entry has no delete pending flag.

2. The method of claim 1, the initializing comprising instructing the first worker thread to:
   responsive to the modified work item entry being inserted into the utility list queue:
      evaluating, by the computing device, the utility list queue to identify a second unassigned work item entry for assignment to the first worker thread as a second assigned work item entry; and
      responsive to the second assigned work item entry having a second expired next run property:
         executing, by the computing device, the second assigned work item entry based upon a second run information property of the second assigned work item entry;
         modifying, by the computing device, the second expired next run property to create a second modified work item entry having a second modified next run property; and
         inserting, by the computing device, the second modified work item entry into the utility list queue based upon the second modified next run property.

3. The method of claim 1, the initializing comprising instructing the first worker thread to:
   responsive to the assigned work item entry having a non-expired next run property, transition, by the computing device, into a sleep state for a timeout period.

4. The method of claim 3, the initializing comprising instructing the first worker thread to:
   responsive to expiration of the timeout period, awakening, by the computing device, into an active state for evaluating the utility list queue for work item entry execution.

5. The method of claim 1, the instructing a first worker thread to evaluate the utility list queue comprising:
   instructing, by the computing device, the first worker thread to:
      responsive to not identifying at least one unassigned work item entry within the utility list queue, transitioning, by the computing device, into a sleep state for a timeout period.

6. The method of claim 1, the initializing comprising:
   instructing, by the computing device, a second worker thread to evaluate the utility list queue for work item entry execution.

7. The method of claim 1, the instructing a first worker thread to execute the assigned work item entry comprising:
   instructing, by the computing device, the first worker thread to:
   dequeueing, by the computing device, the assigned work item entry from the utility list queue;
   unlocking, by the computing device, the utility list queue;
   executing, by the computing device, the assigned work item entry; and
   acquiring, by the computing device, the utility list queue.

8. The method of claim 1, the instructing a first worker thread to insert the modified work item entry comprising:
   instructing, by the computing device, the first worker thread to insert the modified work item entry at an end position of the utility list queue.

9. The method of claim 1, the populating a utility list queue comprising:
   ordering, by the computing device, the utility list queue based upon next run properties of the set of work item entries.

10. The method of claim 1, the instructing a first worker thread to execute the assigned work item entry comprising:
    instructing, by the computing device, the first worker thread to:
    responsive to execution completion of the assigned work item entry, modifying, by the computing device, a last run property of the assigned work item entry to create the modified work item entry having a modified last run property.

11. The method of claim 1, the instructing a first worker thread to evaluate the utility list queue comprising:
    instructing, by the computing device, the first worker thread to modify an assignment property of the unassigned work item entry from an unassigned state to an assigned state to create the assigned work item entry having a modified assignment property indicating that the assigned work item entry is assigned to the first worker thread.

12. The method of claim 1, the populating a utility list queue comprising:
- acquiring, by the computing device, the utility list queue;
- inserting, by the computing device, a new work item entry into the utility list queue based upon a next run property of the new work item entry; and
- unlocking, by the computing device, the utility list queue.

13. The method of claim 1, a first work item entry within the utility list queue corresponding to a file access notification timeout evaluation.

14. A non-transitory machine readable medium having stored thereon instructions for managing one or more worker threads comprising machine executable code which when executed by at least one machine causes the machine to:
- acquire a utility list queue;
- populate the acquired utility list queue with a set of work item entries for execution;
- initialize a set of worker threads to execute work item entries within the utility list queue, the initializing comprising instructing a first worker thread to evaluate the utility list queue to identify an unassigned work item entry for assignment to the first worker thread as an assigned work item entry;
- execute the assigned work item entry based upon a run information property of the assigned work item entry, modify the expired next run property to create a modified work item entry having a modified next run property, and insert the modified work item entry into the utility list queue based upon the modified next run property when determined that the assigned work item entry has an expired next run property;
- remove a target work item entry from the utility list queue when determined that the target work item entry has a delete pending flag; and
- update a next run property of the target work item entry to create an updated work item entry having an updated next run property, insert the updated work item entry into an end position of the utility list queue, and unlock the utility list queue, when determined that the target work item entry has no delete pending flag.

15. A computing device comprising:
a memory containing machine readable medium comprising machine executable code having stored thereon instructions for handling storage element failures to reduce storage device failure dates; and
a processor coupled to the memory, the processor configured to execute the machine executable code to cause the processor to:
- acquire a utility list queue;
- populate the acquired utility list queue with a set of work item entries for execution;
- initialize a set of worker threads to execute work item entries within the utility list queue, the initializing comprising instructing a first worker thread to evaluate the utility list queue to identify an unassigned work item entry for assignment to the first worker thread as an assigned work item entry;
- execute the assigned work item entry based upon a run information property of the assigned work item entry, modify the expired next run property to create a modified work item entry having a modified next run property, and insert the modified work item entry into the utility list queue based upon the modified next run property when determined that the assigned work item entry has an expired next run property;
- remove a target work item entry from the utility list queue when determined that the target work item entry has a delete pending flag; and
- update a next run property of the target work item entry to create an updated work item entry having an updated next run property, insert the updated work item entry into an end position of the utility list queue, and unlock the utility list queue, when determined that the target work item entry has no delete pending flag.

* * * * *